Figure 1:
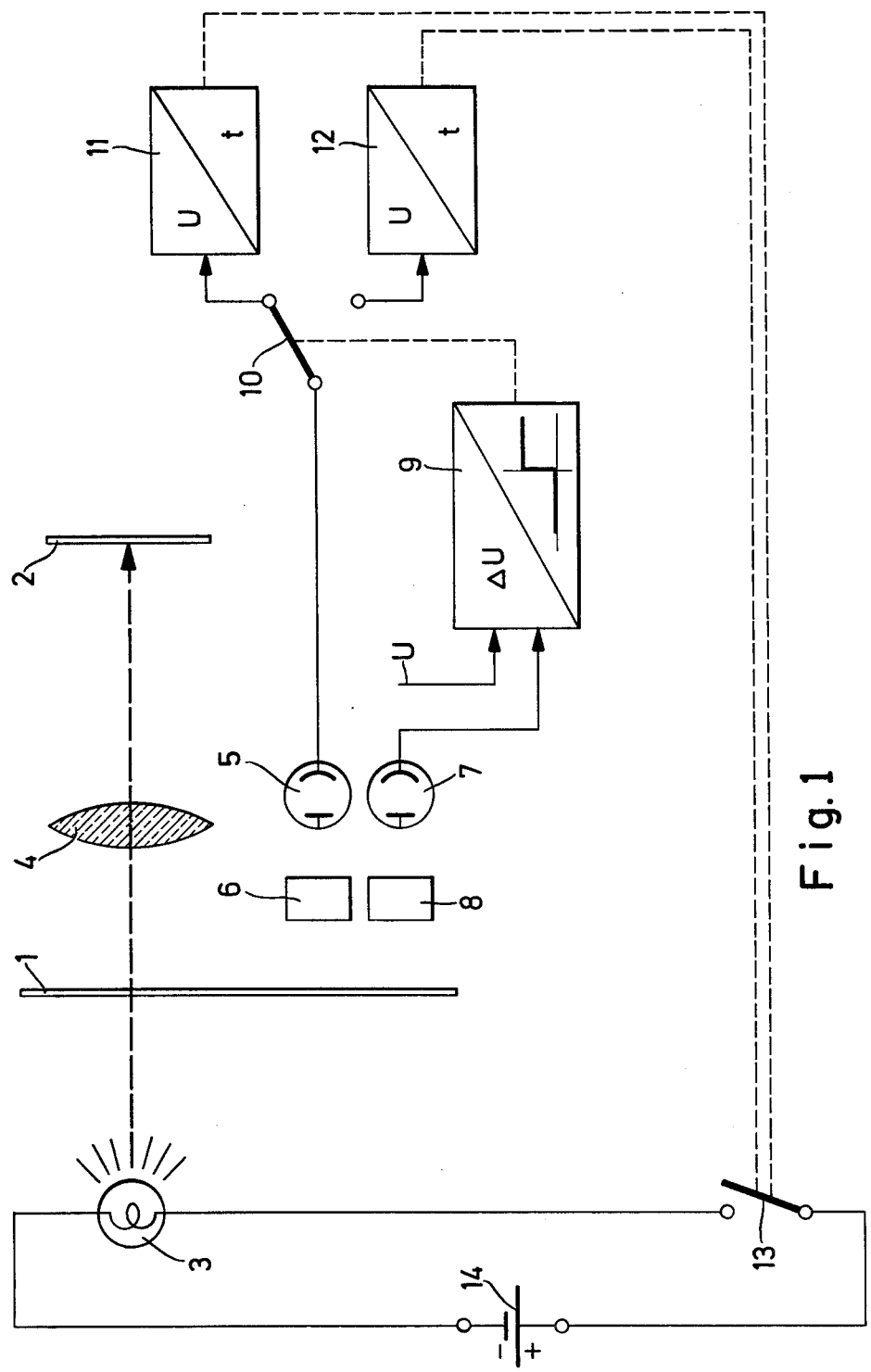

United States Patent [19]

Griesch et al.

[11] 4,093,375
[45] June 6, 1978

[54] METHODS AND APPARATUS FOR AUTOMATIC EXPOSURE CONTROL

[75] Inventors: Dorothee Griesch, Eltville; Herbert Schröter, Taunusstein; Peter Schwägler, Mainz; Eckehard Stein, Frankfurt am Main, all of Germany

[73] Assignee: Hoechst Aktiengesellschaft, Germany

[21] Appl. No.: 680,461

[22] Filed: Apr. 26, 1976

[30] Foreign Application Priority Data

Apr. 28, 1975 Germany .............................. 2518787

[51] Int. Cl.² .................... G03B 27/76; G03B 27/78
[52] U.S. Cl. ........................................ 355/68; 355/71; 355/77; 250/559; 356/202
[58] Field of Search ................ 355/77, 83, 67–71, 355/35, 36, 38; 354/31, 23 R; 250/205, 559, 214 P; 356/51, 202, 203

[56] References Cited

U.S. PATENT DOCUMENTS

| 3,074,312 | 1/1963 | Olson | 356/203 |
| 3,379,110 | 4/1968 | Blackert et al. | 355/68 |
| 3,455,632 | 7/1969 | Neale et al. | 355/68 |
| 3,888,580 | 6/1975 | Amano et al. | 355/38 |
| 4,018,526 | 4/1977 | Schroter | 355/68 |

Primary Examiner—L. T. Hix
Assistant Examiner—W. J. Brady
Attorney, Agent, or Firm—James E. Bryan

[57] ABSTRACT

This invention relates to a method of exposure control in photographic printing apparatus for printing from originals made on different types of photographic material, the method comprising:

determining which of at least two types (such as silver halide or diazo film) of photographic material the original employs by an examination of the spectral transmission characteristics of the original,
determining the image density of the original, and
controlling the exposure in accordance with both the type of material as determined and the image density.

31 Claims, 8 Drawing Figures

METHODS AND APPARATUS FOR AUTOMATIC EXPOSURE CONTROL

This invention relates to methods and apparatus for automatic exposure control in photo-printing from a photographic original.

It is well known that in order to save storage space, original documents can be photographically reduced onto microfilm. It is also known to provide a photo-printing apparatus for producing a large format copy from an original microfilm, this is known as "re-enlargement" of the microfilm. Because there is usually a variation in image density between one microfilm and another it is necessary to adjust the re-enlargement exposure time in accordance with the particular microfilm from which a print is being made.

Microfilm re-enlarging apparatus is known in which the amount of light for the exposure of light-sensitive material can be manually controlled. Microfilm re-enlarging apparatus having a brightness control for the light source is known as is apparatus in which the exposure time is variable while the light intensity remains constant. By manual adjustment of the brightness control, or of the exposure duration control, the amount of light can be adjusted in accordance with the particular microfilm from which a print is being made and with the light-sensitivity of the light-sensitive material. The operator should take into account the following factors: light transmission characteristic of the microfilm, contrast of the microfilm image, line width in the image, and sensitivity of the light-sensitive material. In microfilm re-enlarging apparatus with automatic microfilm feed, it is known to divide the microfilms into at least two exposure classes beforehand.

Outside the specific field of microfilm re-enlarging apparatus, photoprinting machines are known in which there is an automatic control of the amount of light to which a light-sensitive material is exposed through a transparent original.

In copying machines using positive originals and chemical development, the transparency of the original is measured and the run-through speed of the original and copying material past the exposure light is controlled accordingly. It is known to make the response of the measuring element correspond to the variation in sensitivity of the copying material to light of different wave lengths. This result is achieved by use of a suitable filter for light reaching the measuring element. In particular, several filter elements can be used with different pass-bands, a respective adjustable attenuator being provided for each filter element. This arrangement is described in German Offenlegungsschrift No. 2,119,871.

In some copying machines, copying materials of different sensitivity are provided and one is selected according to the format of the original. A sensing device determines the format of the original, selects one of the copying materials and switches into an exposure control circuit a circuit having a characteristic corresponding to the light-sensitivity of the copying material selected. This arrangement is described in German Offenlegungsschrift No. 2,209,725.

It has been found, however, that taking into account the light-sensitivity of the light-sensitive material, using a measuring element corrected for the spectral response of the material, and employing an experienced operator still do not result in microfilm re-enlargements of consistently first-rate quality.

In the embodiments of the invention shortly to be described with reference to the drawings, the transmission of a microfilm is measured in a spectral band to which a light-sensitive material is sensitive (the actinic light transmission), and also in another spectral band to determine the type of material employed in the microfilm, and the exposure is then controlled in accordance with both the actinic light transmission and type of the microfilm as determined by the measurement in the said another spectral band.

Different types of microfilm have different effective contrasts even where the image content is identical. "Effective contrast" is used to mean the difference in density between image and non-image areas as measured by an arrangement adjusted to the spectral sensitivity of the light-sensitive material. Effective contrast can vary according to the geometrical arrangement of the light source illuminating the original. In the case of silver halide films and diazo films with vesicular images there is a very significant difference between illumination with parallel and with diffused light but this is not true of ordinary diazo films where the image has no grain structure. The difference in effective contrast from film type to film type is particularly marked in the case of high density images.

Because the embodiments of the invention take the type of microfilm material into account, better control of exposure time is achieved.

Figure 3:
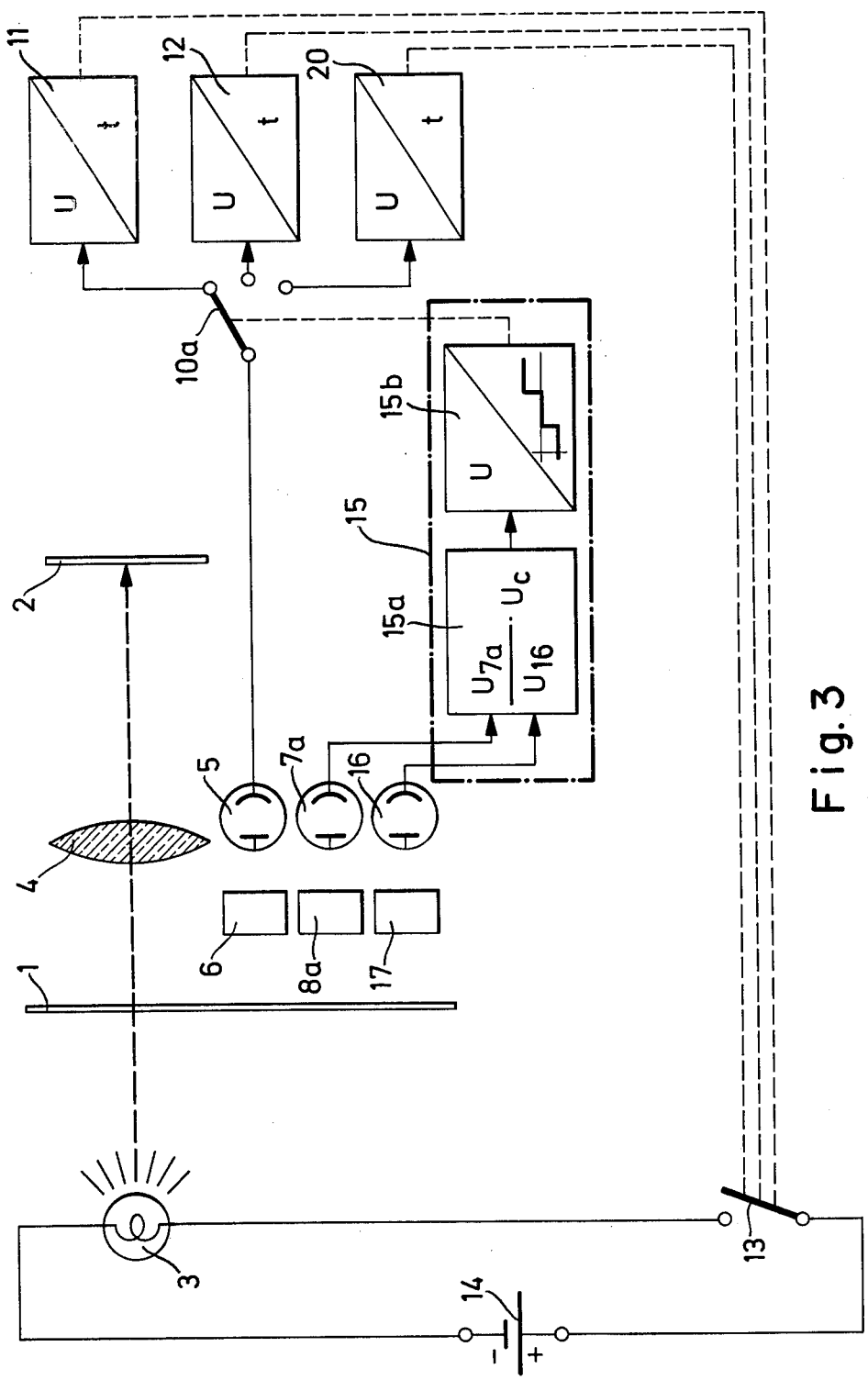
Figure 4:
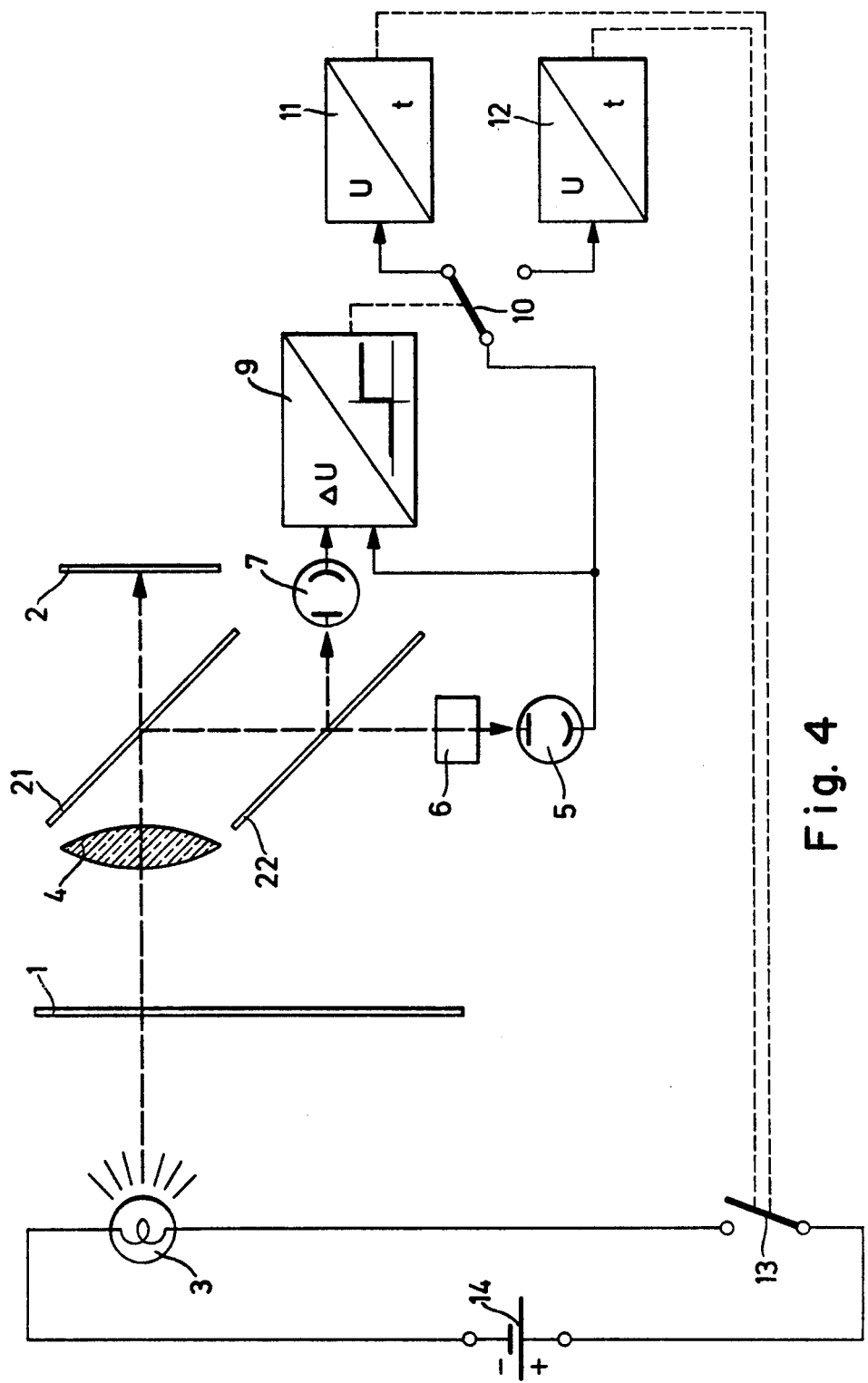
Figure 5:
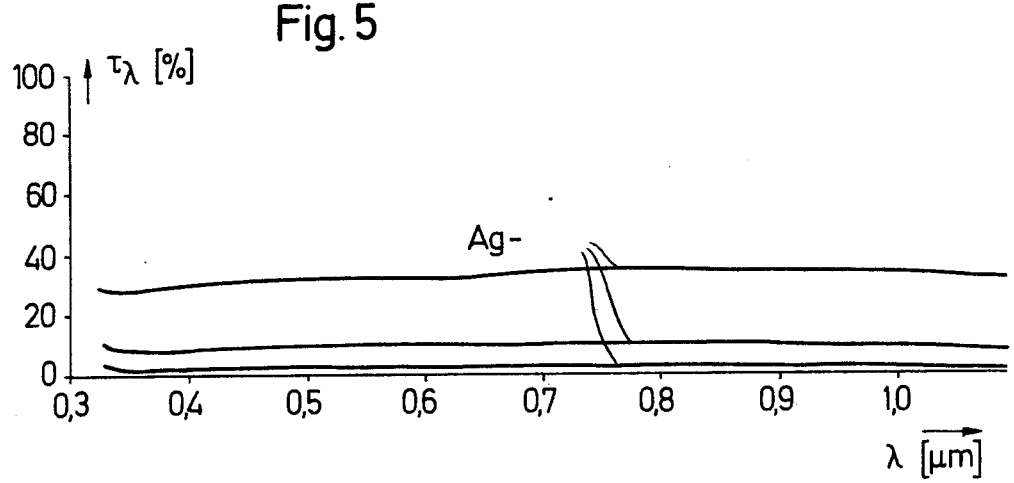
Figure 6:
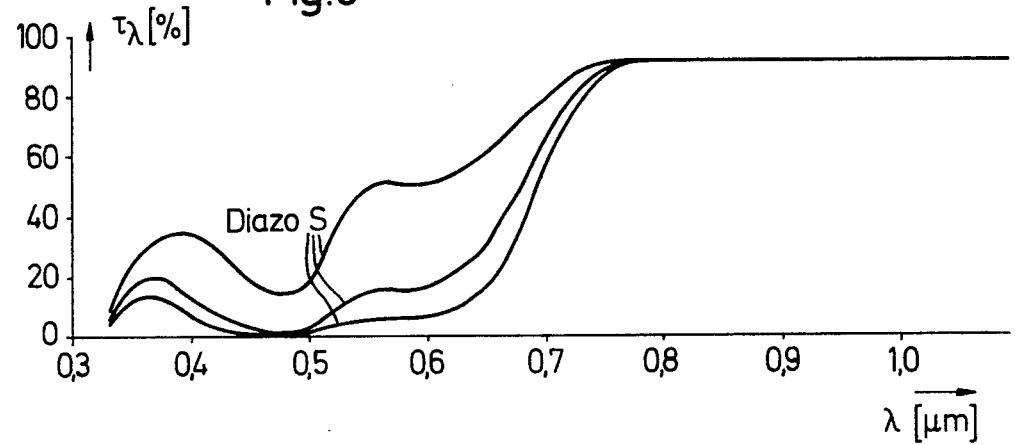
Figure 7:
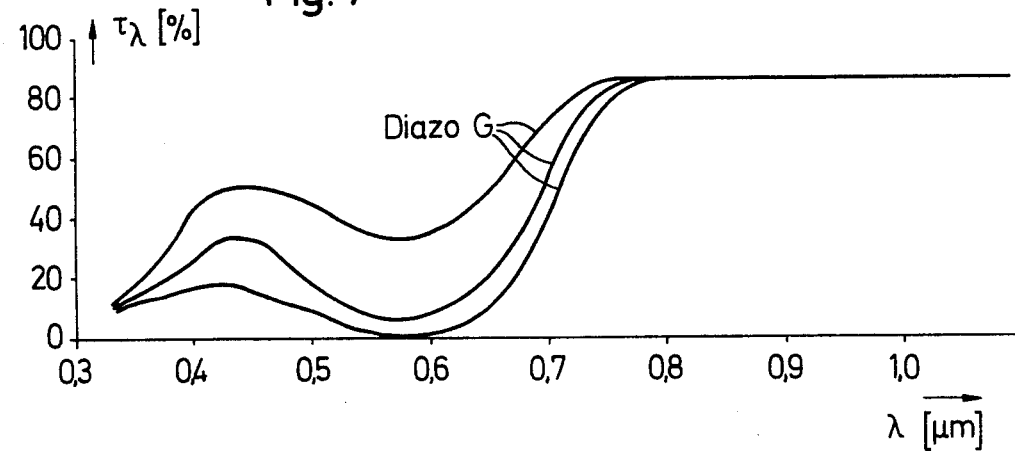
Figure 8:
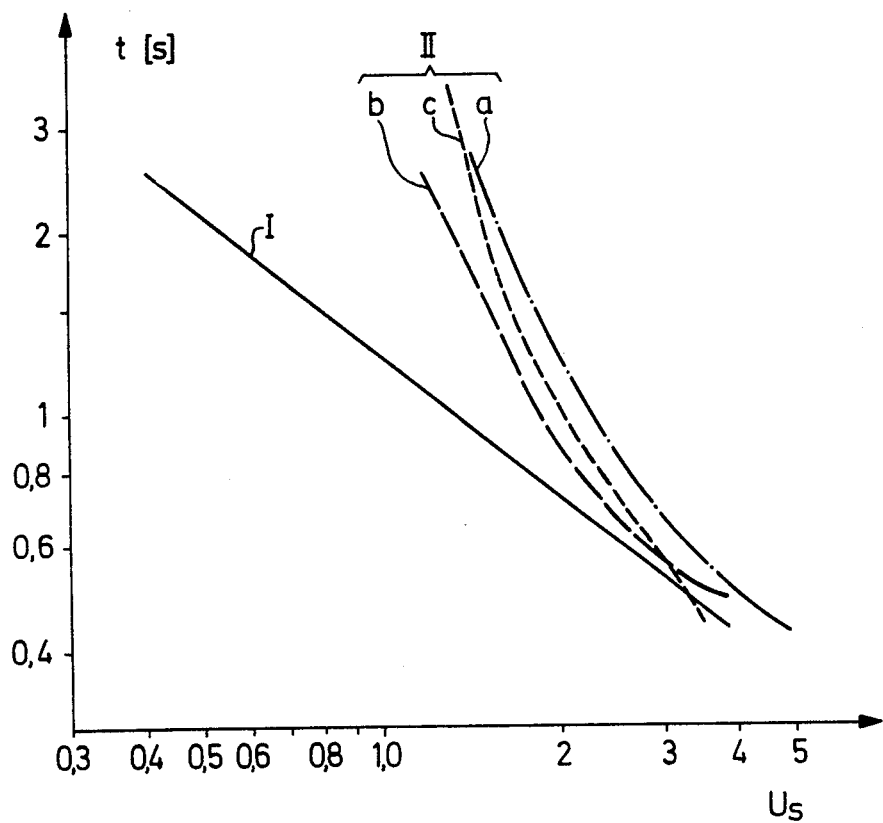

By way of example only, certain illustrative embodiments of the invention will now be described with reference to the accompanying drawings, in which:

FIGS. 1 to 4 show schematically and respectively first, second, third and fourth microfilm re-enlarging apparatus embodying the invention, FIGS. 5, 6, and 7 are graphs each showing the transmisstion characteristics of a respective type of microfilm in relation to light wave length for three different image densities, and FIG. 8 is a graph showing, for different types of microfilm, the relationship between exposure time in printing from the microfilm and the output of a light measuring element.

An explanation of the embodiments will be given in general terms before referring specifically to the figures.

In the embodiments, the light transmission of a microfilm original is measured over a spectral band in the actinic region corresponding to the spectral sensitivity of a light-sensitive material onto which the microfilm is to be printed (this measurement thus evaluates the actinic light transmission), the transmission factor of the microfilm is measured in at least one additional spectral band in which characteristic transmission parameters lie (this measurement is to enable the microfilm material to be identified by its transmission characteristics in the additional spectral band), the transmission factor is classified into one of at least two transmission factor ranges (each range representing a particular type of material), the amount of light required for exposure is determined from the measured actinic light transmission taking into account the type of microfilm material as determined by the classification into one of the two ranges. In the embodiment shown in FIG. 1, two exposure/measured light function generators are provided and one or the other is selected according to which of the ranges contains the transmission factor.

The "type" of material of a microfilm refers to the carrier material and its preparation or coating, especially with the image-carrying substance. Principal types of material are silver halide film and diazo film. In addition, however, a group of film materials of the same general nature (for example, diazo films) can be regarded as being of different "types."

A "transmission factor range" refers to the range of transmission values measured over a particular spectral band which a particular type of material possesses for different optical densities. As used here, "transmission factor" can mean transmission value in one spectral band relative to transmission value in another spectral band as well as merely measured transmission in one spectral band. A transmission value in one band can be expressed "relative" to the transmission value in another band by the transmission factor being a ratio or a difference of the transmission values in the two bands.

Since account is taken of the type of microfilm material employed (in particular, its image-carrying substance), better quality prints can be obtained than would otherwise be possible.

Thus, transmission of the microfilm material is measured in at least one spectral band in which transmissions for different types of materials have different and characteristic values. The measured transmission is classified into a transmission range which is characteristic of a particular type of material. For each type of material, there is assigned a relationship between measured actinic light (the transmission of the microfilm in the spectral band to which the light-sensitive material is sensitive) and amount of light with which to expose the light-sensitive material through the microfilm in order to achieve correct exposure. These relationships can be determined empirically for each of the types of material to be distinguished from each other. Each relationship can then be embodied in a respective exposure/measured light function generator.

As many different types of materials can be given respective exposure/measured light function generators as can be distinguished by measurement and classification into characteristic ranges.

Thus, the transmission factors of silver halide films measured at 700 nanometers are significantly less at all image densities than the transmission factors of diazo films of greater or lesser image density. In general, measurement will be carried out not for a single wave length but over a spectral band and unambiguous results are also obtained when measurement is taken over a spectral band consisting of 650 nanometers and longer wave lengths into the infrared region. The classification into a transmission range of the measurement in the infrared region is used to control the exposure to actinic light. For a relatively small measured actinic light intensity, the exposure needs to be less in the case of a silver halide film than in the case of a diazo film. The "small" measured actinic light intensity means a light intensity small in comparison with what the light-intensity would be if the microfilm carried no image at all.

In order to distinguish different diazo materials from each other, the microfilm transmission is measured over at least two partial spectral bands in the actinic region, the signals measured in the two partial spectral bands are compared and the results of the comparison classified. For example, the first partial band can be 450 nanometers to 500 nanometers and the second partial band can be 550 nanometers to 600 nanometers. This arrangement is shown in FIG. 3.

Instead of using a respective exposure/measured light function generator for each type of material (FIGS. 1, 3 and 4), it is possible and advantageous to use a single exposure/measured light function generator and a correction unit to change the exposure given by the single function generator to that which would have been given by a further function generator had it been provided. This arrangement is shown in FIG. 2. The correction unit includes a correction member controlling the amount of light with which a light source exposes the light-sensitive material through the microfilm.

Figure 2:
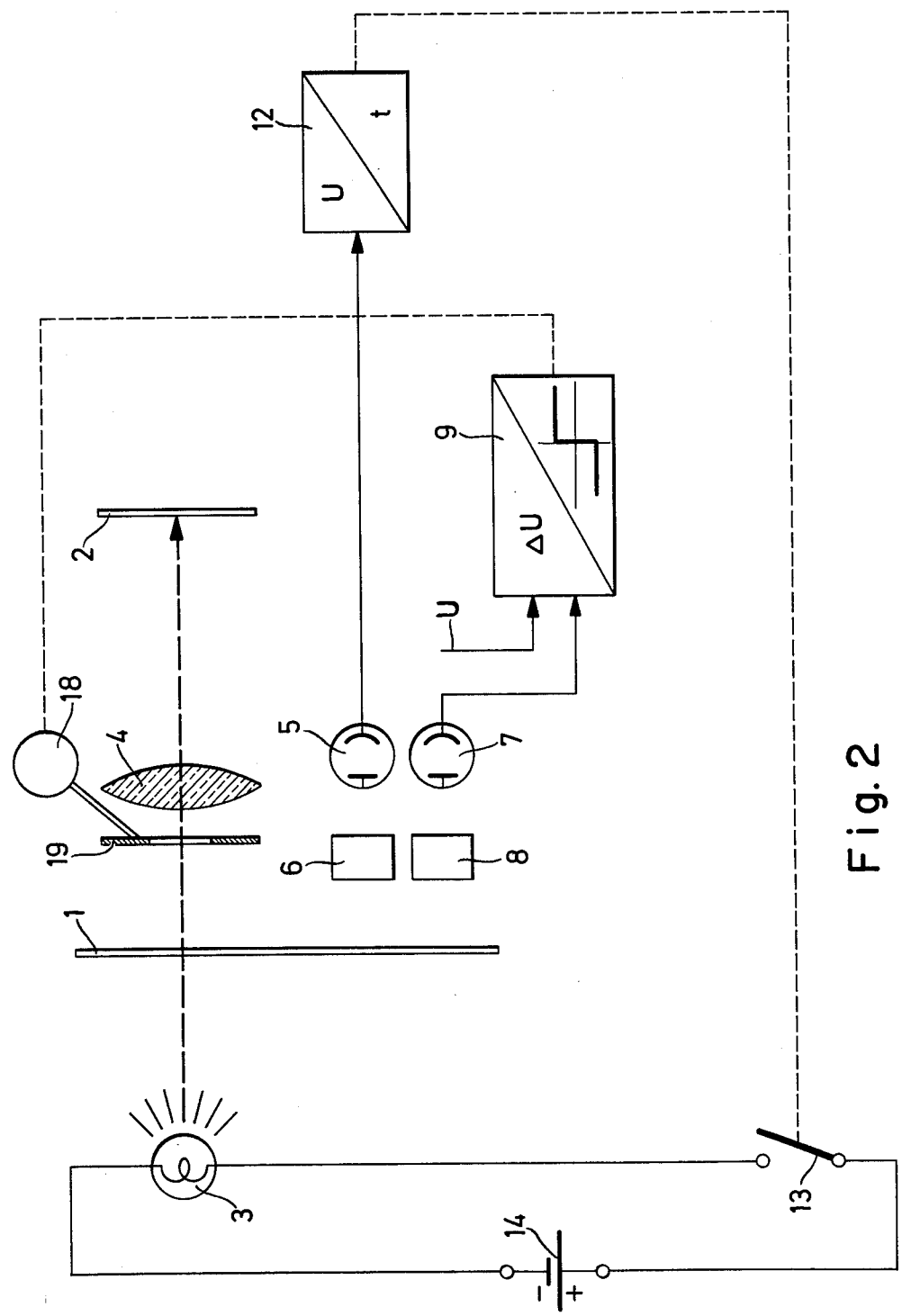

In FIG. 1, reference 1 represents microfilm a part of which is to be enlarged and printed onto a light-sensitive material 2. Preferably, zinc oxide paper is used for the light-sensitive material 2; a latent electrostatic image is produced on it by electrostatic charging and subsequent exposure to the image of the desired part of the microfilm, and the image is developed with electrically charged particles of dyestuff. The development process is a known one and one in which there is a response not so much to charge density but predominantly to the gradients of the density of the charge in the plane of the paper. Only the most important parts of the microfilm re-enlarging apparatus are shown, namely: a light source 3 and a lens 4 reproducing a part of the microfilm 1 onto the light-sensitive material 2.

Part of the light passing through the microfilm 1 reaches a photo-electric transducer 5 after first passing through a filter 6. The spectral transmission characteristic of the filter 6 is such that the combined spectral characteristic of the filter 6 and photo-electric transducer corresponds, at every light wave length having a significant effect on the material 2, to the spectral sensitivity of the material 2. The filter 6 and the photo-electric transducer 5 thus form a light-sensitive measuring device which measures the transmission of the microfilm 1 over a spectrum in the actinic region, the measured signal taking into account the spectral sensitivity of the light-sensitive material. A second light-sensitive measuring device is formed by a filter 8 and a photo-electric transducer 7. This second light-sensitive measuring device measures the transmission of the microfilm at wave lengths greater than 650 nanometers in the red and infrared regions. The elements 5 and 6, 7 and 8 are so placed as not to obstruct the imaging of the area of the microfilm to be printed onto the material 2.

The photo-electric transducer 7 of the infrared measuring device is connected to one input of a classifying circuit 9. The classifying circuit 9 comprises a comparator which compares the output voltage of the transducer with a reference voltage U, and a switch control circuit having one or other of two output states according to the result of the comparison.

The output of the classifying circuit 9 is connected to control the wiper of a change-over switch 10. The change-over switch 10 connects the output of the transducer 5 to either one exposure time/measured light function generator 11 or another exposure time/measured light function generator 12.

The reference voltage U of the classifying circuit 9 is chosen so that the wiper of the switch 10 takes up one or the other of its two positions depending on whether the microfilm 1 employs silver halide material or diazo material. For this purpose, the signals of the infrared measuring device 7, 8 are classified into one signal range characteristic of one type of material or into another signal range characteristic of the other type of material.

The boundary between the two signal ranges is defined by the reference voltage U which is adjustable.

To illustrate the signal ranges for different types of microfilm, reference will now be made to FIGS. 5, 6, and 7. FIG. 5 shows the percentage light transmission of a silver halide microfilm as a function of light wave length. Curves from measurements in diffused light for three silver halide microfilms of different density are shown, the lowest curve corresponding to the greatest density. Corresponding curves for a diazo microfilm based on a polyester material and known in Germany under the trade name "P 110 S" are plotted in FIG. 6, and corresponding curves for another polyester based diazo microfilm known as "P 110 G" are shown in FIG. 7. Comparison of the transmission values of the curves in FIGS. 5, 6, and 7 shows that the transmission of diazo microfilm at a light wave length of 700 nanometers at any of the three densities is always greater than the transmission of the silver halide microfilm at any density. The range of possible output values produced from the transducer 7 for a given intensity of light from the source 3 for a specific type of material is thus a characteristic signal range for that material. A well-defined signal range is also obtained when the spectral band to which the transducer 7 responds starts at 650 nanometers and extends well into the infrared region, for example, to at least 800 nanometers. The reference voltage U is adjusted so that it is greater than the output signal range for silver halide microfilm, but is smaller than the output signal range for diazo materials. Accordingly, the wiper of switch 10 takes up one or the other position depending on whether the transducer 7 receives light from a silver halide microfilm or a diazo microfilm.

For silver halide microfilms, the photo-electric transducer 5 of the actinic light measuring device is connected to the exposure time/measured light function generator 11. If, however, the transducer 7 receives light from diazo microfilm, then the photo-electric transducer 5 is connected to the exposure time/measured light function generator 12. The outputs of the function generators 11 and 12 are arranged to actuate a switch 13 which is connected in circuit with the light source 3 and a source of current 14.

As an alternative to the switch 13, a shutter positioned between the light source and the light-sensitive material 2, and controlled by the function generators 11, 12 can be used. In this case, the light source 3 is lit continuously.

The exposure time/measured light function generators 11 and 12 have different characteristics but each characteristic consists of there being produced a pulse having a duration determined for each value of the output of the photo-electric transducer 5. The switch 13 is closed for the duration of the pulse and it thus corresponds to exposure time.

Each function generator 11, 12 can consist, for example of a diode network synthesizing a non-linear function, followed by an integrator and a comparator.

FIG. 8 shows the relationship (for a given light intensity) between the output voltage $U_s$ of the photo-electric transducer 7 and the time for which the light-sensitive material 2 is to be exposed for several different types of microfilm material. The curve I shows the correct exposure times to be given in the case of a silver halide microfilm. Curves $a$, $b$, and $c$ show respectively the correct exposure times to be given where the microfilm is "P 110 S" polyester-based diazo microfilm, "P 110 G" polyester-based diazo microfilm, and "GM" acetate-based diazo microfilm. Curves $a$, $b$, and $c$ are collectively referenced "II." Since only one function generator 12 is provided in FIG. 1 for diazo microfilms it is given a characteristic corresponding to the mean (not shown) of the curves II. The mean value is selected so that the characteristic of the function generator 12 is suitable for all diazo microfilms used.

To print using the re-enlarging apparatus of FIG. 1, the switch 13 is closed by a start-signal generator (not shown) which is connected to the function generators 11 and 12. The light source 3 shines through the selected area of the microfilm 1 and the lens 4 produces an image on the light-sensitive material 2. At the same time, the photo-electric transducers 5 and 7 receive light from the microfilm. The photo-electric transducer 7 measures the transmisstion of the microfilm at a wave length greater than 650 nanometers. This signal is compared with the reference voltage U in the classifying circuit 9. Thus, it is established whether the signal falls below the reference voltage U so indicating that the microfilm is of silver halide type, or whether the signal of the photo-electric transducer 7 exceeds the reference voltage U so indicating that the microfilm is of a diazo type. Depending on the type of microfilm material, the photo-electric transducer 5 of the actinic light measuring device is connected to either the input of the exposure time/measured light function generator 11, or to the input of the exposure time/measured light function generator 12. The relevant function generator connected in circuit holds switch 13 closed for an exposure time determined by the output from transducer 5. This exposure time is, of course, appropriate to the nature of the microfilm material and accords to the characteristics shown in FIG. 8. At the end of the exposure time the function generator connected in circuit opens switch 13, so that the next area for re-enlargement can be selected. The microfilm 1 is preferably in the form of a microfilm card.

The light-sensitive material is thus exposed with an enlarged image of a part of the microfilm 1, the exposure time taking into account both the type of material employed in the microfilm and its image density.

A second re-enlarging apparatus is shown in FIG. 2 and those parts which correspond to the apparatus of FIG. 1 bear identical reference numerals. The description of FIG. 2 will be largely confined to the differences from the apparatus of FIG. 1.

Whereas FIG. 1 has two function generators 11, 12, the apparatus of FIG. 2 has only one function generator 12 to which the actinic light transducer 5 is connected. The output of the single function generator 12 is connected to the switch 13.

Irrespective of the material of the microfilm 1, the exposure time is determined as a function of the output of the photo-electric transducer 5 and corresponding to the mean of the diazo material curves II of FIG. 8. An adjustable diaphragm 19 is, however, provided so that the intensity of the image-forming light can be adjusted in accordance with the type of material of the microfilm. For this purpose, the diaphragm 19 is mechanically coupled to a correction motor 18 controlled by the output of the classifying circuit 9.

When the classifying circuit 9 detects diazo microfilm it causes the motor 18 to set the diaphragm so that the light intensity is that for which the curves II were plotted. When the classifying circuit 9 detects silver halide microfilm, it causes the motor 18 to stop-down the diaphragm 19 so that, although the exposure time still corresponds to the mean of the curves II, the light intensity is reduced so that the exposure corresponds effectively to a point on the curve I.

A third re-enlarging apparatus is shown in FIG. 3 and those parts which correspond to the apparatus of FIGS. 1 and 2 bear identical reference numerals. The description of FIG. 3 will be largely confined to the differences from the apparatus already described.

The apparatus of FIGS. 1 and 2 employ classifying circuits 9 which classify the microfilm as being merely either silver halide type or diazo type, the apparatus of FIG. 3 has a classifying circuit 15 which classifies the microfilm into one of three different types.

The classifying circuit 15 comprises a quotient-forming circuit 15a connected to a switch control circuit 15b. The quotient-forming circuit 15a takes two input voltages supplied to it and divides one into the other to form the quotient of the two. The switch control circuit 15b has three output states.

In FIG. 3, the transducer 7 and filter 8 are replaced by a transducer 7a and filter 8b, the combination being responsive to light in the band 450 to 500 nanometers which forms a part of the actinic spectrum. A further transducer 16 and filter 17 are provided, this latter combination being responsive to light in the band 550 to 600 nanometers which again forms a part of the actinic spectrum.

The outputs of the transducers 7a and 16 are connected to the quotient-forming circuit 15a. The switch control circuit 15b includes a two-level comparator to classify each quotient formed into one of three ranges, each range representing a particular type of microfilm material.

The output of the switch control 15b is connected to control the wiper of a three-way switch 10a which connects the output of the photo-electric transducer 5 to any one of three exposure time/measured light function generators 11, 12, 20 according to the wiper position as controlled by the classifying circuit 15. Each function generator has a characteristic corresponding to a respective one of the curves a, b, I of FIG. 8. The formation of quotients is very effective in distinguishing types of material from each other.

At the start of making a re-enlargement the switch 13 is, as before, closed by a start signal generator (not shown). The output signals of the photo-electric transducers are divided in the quotient-forming circuit 15a. The quotient so formed is characteristic of the microfilm material giving rise to it.

A fourth re-enlarging apparatus is shown in FIG. 4 and again its description will be confined to the differences from the apparatus already described.

In FIG. 4, a beam divider plate 21 is interposed between the lens 4 and light-sensitive material 2. The plate 21 is partially reflecting and is neutral as regards its spectral properties. Light is reflected by the plate 21 onto a dichroic divider plate 22. The dichroic plate 22 takes light reflected from the plate 21, reflects the infrared part to the transducer 7, and transmits the actinic part to the filter 6 and transducer 5. It is therefore advantageous in allowing the transducer 7 to be used without the filter 8 shown in the previous figures.

The classifying circuit 9 of FIG. 4 differs from the classifying circuit 9 of FIG. 1 in that the former employs a difference-forming circuit and a switch control circuit instead of the comparator and switch control circuit of the latter. The difference-forming circuit has an output representing the difference in outputs of the transducers 6 and 7 which is, again, characteristic of the material type of the microfilm.

The described embodiments possess the advantage of giving improved exposure control with comparatively little expense, the extra expense of taking into account different material types being of little consequence when compared with the advantage to be gained.

The comparison of transmission characteristics in two or more spectral bands by the formation of differences or quotients is a very effective technique for differentiating between types of microfilm which can not be differentiated by examination of a single band because image density variation masks the intrinsic variation in transmission characteristics. For example, transmission values in the infrared region are not in themselves suited to distinguishing several diazo materials from each other.

As FIG. 2 shows, it is not necessary to provide a separate exposure/measured light function generator for each and every material type. Further, in some cases it is possible to give the effect of having more than one exposure/measured light function generator by using a switch network to change the value of one or more passive elements (for example, resistors) in a single function generator. It is not necessary that the function generators control exposure time, they could alternatively control light intensity. A single function generator controlling light intensity can be used with a switch selecting exposure time according to the type of microfilm material.

More than one transducer can be used for determining the actinic light transmission of the microfilm, for example, the image density of the microfilm can be measured at a number of different points and one measurement selected or the measurements combined. There can be a respective actinic light measuring transducer for each function generator if desired.

Other types of photoprinting apparatus besides microfilm re-enlarging apparatus can embody the invention. Chemical development is an alternative to electrostatic development.

It will be obvious to those skilled in the art that many modifications may be made within the scope of the present invention without departing from the spirit thereof, and the invention includes all such modifications.

What is claimed is:

1. A method of exposure control in photographic printing apparatus for printing from originals made on different types of photographic material, the method comprising:
   determining which of at least two types (such as silver halide or diazo film) of photographic material the original employs by an examination of the spectral transmission characteristics of the original,
   determining the image density of the original, and
   controlling the exposure in accordance with both the type of material as determined and the image density.

2. A method as claimed in claim 1 wherein the photographic material is microfilm and the image density is determined from the actinic light transmission through the microfilm.

3. A method as claimed in claim 1, wherein the spectral transmission characteristics in a band in the red and infrared regions are examined to distinguish silver halide material from diazo material.

4. A method as claimed in claim 3, wherein the band in the red and infrared regions commences at approximately 650 nanometers wave length.

5. A method as claimed in claim 1, wherein the spectral transmission characteristics in at least two spectral bands are compared.

6. A method as claimed in claim 5, wherein the comparison of the characteristics in at least two spectral bands includes subtracting a signal representing the transmission in one band from a signal representing the transmission in another band.

7. A method as claimed in claim 5, wherein the comparison of the characteristics in at least two spectral bands includes dividing a signal representing the transmission in one band by a signal representing the transmission in another band.

8. A method as claimed in claim 1, wherein the spectral transmission characteristics in at least two bands in the actinic region are examined to distinguish between different diazo materials.

9. A method as claimed in claim 8, wherein one of the said bands extends from approximately 450 to approximately 500 nanometers wave length.

10. A method as claimed in claim 8, wherein one of the said bands extends from approximately 550 to approximately 600 nanometers wave length.

11. Photographic printing apparatus for printing from originals made on different types of photographic material, the apparatus comprising:
    means to determine which of at least two types (such as silver halide or diazo film) of photographic material the original employs comprising means to examine the spectral transmission characteristics of said original,
    means to determine the image density of the original, and
    means to control the exposure in accordance with both the type of material as determined and the image density.

12. Apparatus as claimed in claim 11, wherein the apparatus is a microfilm re-enlargement apparatus and the means to determine the image density comprises means to measure actinic light transmission through the microfilm.

13. Apparatus as claimed in claim 11, wherein the means to examine the spectral transmission characteristics is arranged to respond to transmission in the red and infrared regions to distinguish silver halide material from diazo material.

14. Apparatus as claimed in claim 13, wherein the means to examine the spectral transmission characteristics comprises a photo-electric transducer and a filter operative to respond to wave lengths in the red and infrared regions.

15. Apparatus as claimed in claim 14, wherein the photo-electric transducer and filter are responsive to wave lengths commencing at approximately 650 nanometers.

16. Apparatus as claimed in claim 11, wherein the means to examine the spectral transmission characteristics is arranged to compare the transmission characteristics in at least two spectral bands.

17. Apparatus as claimed in claim 16, wherein the means to examine the spectral transmission characteristics comprises a first photo-electric transducer and filter to measure transmission in one band and a second photo-electric transducer and filter to measure transmission in another band.

18. Apparatus as claimed in claim 17, wherein a difference-forming circuit is connected to the outputs of the first and second transducers to compare the said transmissions by forming their difference.

19. Apparatus as claimed in claim 17, wherein a quotient-forming circuit is connected to the outputs of the first and second transducers to compare the said transmissions by forming their quotient.

20. Apparatus as claimed in claim 17, wherein the first transducer and filter are responsive to a band extending from approximately 450 to approximately 500 nanometers wave length.

21. Apparatus as claimed in claim 19, wherein the second transducer and filter are responsive to a band extending from approximately 550 to approximately 600 nanometers wave length.

22. Apparatus as claimed in claim 12, wherein the means to determine the image density comprises a first photo-electric transducer and filter responsive to actinic light and the means to examine the spectral transmission characteristics comprises a second photo-electric transducer arranged to respond to wave lengths in the red and infrared regions and a difference-forming circuit connected to the outputs of the first and second transducers to compare the said transmissions by forming their difference.

23. Apparatus as claimed in claim 22, wherein a dichroic plate is provided to transmit light to the first transducer and to reflect light to the second transducer.

24. Apparatus as claimed in claim 11, wherein the means to control the exposure comprises a respective exposure function generator for each type of material determinable by the means to determine the type of photographic material, and means to connect one of the exposure function generators to the output of the means to determine the image density in accordance with the material type determined.

25. Apparatus as claimed in claim 11, wherein the means to control the exposure comprises an exposure time/function generator having a common characteristic for all types of material determinable by the means to determine the type of photographic material and arranged to respond to the output of the means to determine the image density, and means to control light intensity in accordance with the material type determined.

26. Apparatus as claimed in claim 14, wherein the means to determine the type of photographic material includes a comparator operative to compare the output of the transducer with a predetermined level.

27. Apparatus as claimed in claim 18, wherein the means to determine the type of photographic material includes a comparator operative to compare the output of the difference-forming circuit with one or more predetermined levels.

28. Apparatus as claimed in claim 19, wherein the means to determine the type of photographic material includes a comparator operative to compare the output of the quotient-forming circuit with one or more predetermined levels.

29. Apparatus as claimed in claim 22, wherein the means to determine the type of photographic material includes a comparator operative to compare the output of the difference-forming circuit with a predetermined level.

30. Apparatus as claimed in claim 24, wherein each exposure function generator is operative to provide a respective exposure time for each value in a range of image densities.

31. Apparatus as claimed in claim 26 wherein the comparator is connected to a switching circuit operative to select one of a plurality of function generators, each function generator being adapted to control the exposure in accordance with both the type of material as determined and the image density.

* * * * *